United States Patent [19]

Rudi

[11] Patent Number: 5,438,469
[45] Date of Patent: Aug. 1, 1995

[54] METHOD AND APPARATUS FOR COARSE AND FINE POSITIONING A MAGNETIC HEAD WITH THREE PIEZOELECTRIC ELEMENTS ARRANGED IN A TRIPOD ARRANGEMENT

[75] Inventor: Guttorm Rudi, Fjellhamar, Norway

[73] Assignee: Tandberg Data A/S, Oslo, Norway

[21] Appl. No.: 163,486

[22] Filed: Dec. 7, 1993

Related U.S. Application Data

[63] Continuation of Ser. No. 836,955, Feb. 19, 1992, abandoned.

[51] Int. Cl.$^6$ .................. G11B 5/584; G11B 5/56; G11B 5/55
[52] U.S. Cl. .................. 360/109; 360/77.12; 360/78.02
[58] Field of Search ............ 360/109, 104, 106, 78.02, 360/77.12

[56] References Cited

U.S. PATENT DOCUMENTS

| | | | |
|---|---|---|---|
| 4,188,645 | 2/1980 | Ragle et al. | 360/109 |
| 4,392,163 | 7/1983 | Rijckaert et al. | 360/109 |
| 4,507,696 | 3/1985 | Hüter | 360/109 |
| 4,583,135 | 4/1986 | Kimura | 360/109 |
| 4,679,104 | 7/1987 | Dahlerud | 360/78 |
| 4,866,548 | 9/1989 | Rudi | 360/77.02 |
| 4,989,109 | 1/1991 | Morrisawa | 360/106 |
| 5,003,423 | 3/1991 | Imamura et al. | 360/125 |
| 5,191,492 | 3/1993 | Nayak et al. | 360/78.02 |

FOREIGN PATENT DOCUMENTS

| | | |
|---|---|---|
| 0026524 | 4/1981 | European Pat. Off. |
| 3242334 | 6/1984 | Germany . |

OTHER PUBLICATIONS

Burleigh Brochure entitled "Micropositioning Systems" (1989).
Patent Abstracts of Japan, vol. 8058, Mar. 1984, Publication No. 58205925.

*Primary Examiner*—John H. Wolff
*Assistant Examiner*—Craig A. Renner
*Attorney, Agent, or Firm*—Hill, Steadman & Simpson

[57] ABSTRACT

An apparatus for positioning a magnetic head relative to a magnetic tape includes a platform for coarsely positioning the magnetic head, roughly to a desired track of the magnetic tape. A piezoelectric element is provided for fine positioning the magnetic head. The piezoelectric element is arranged between a bottom of the platform and the magnetic head.

15 Claims, 3 Drawing Sheets

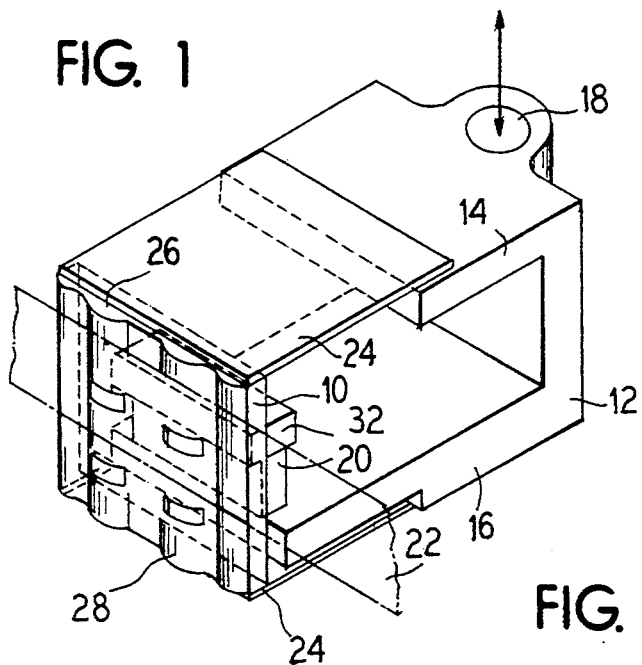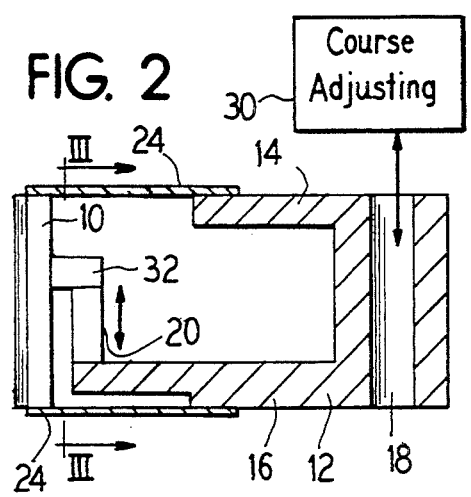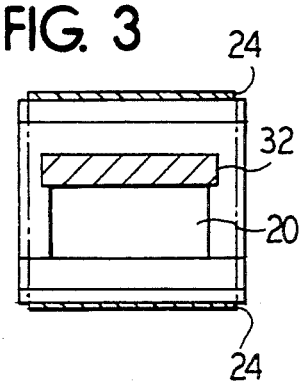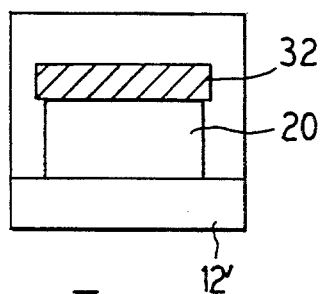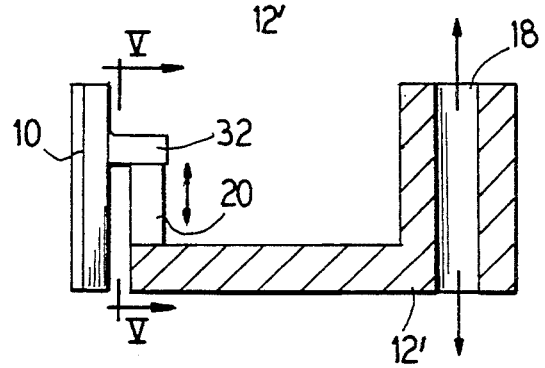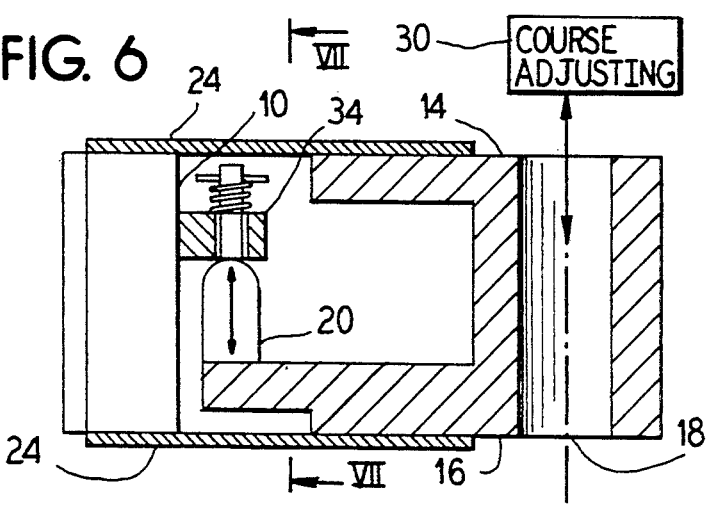

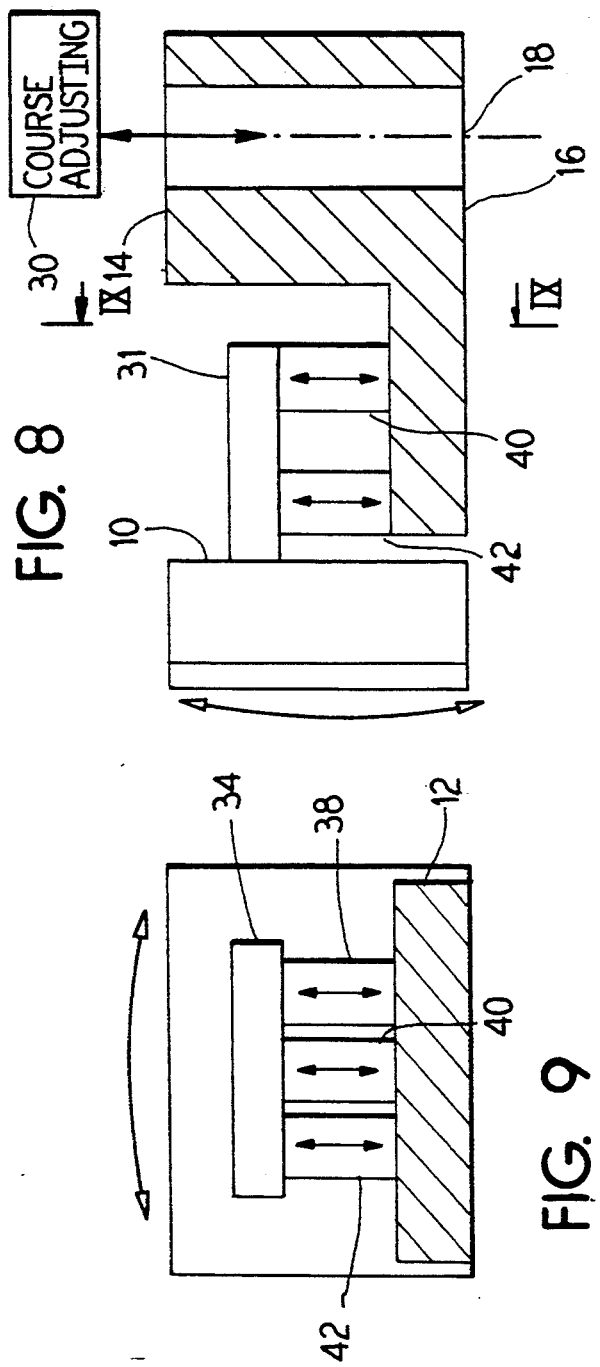
FIG. 8
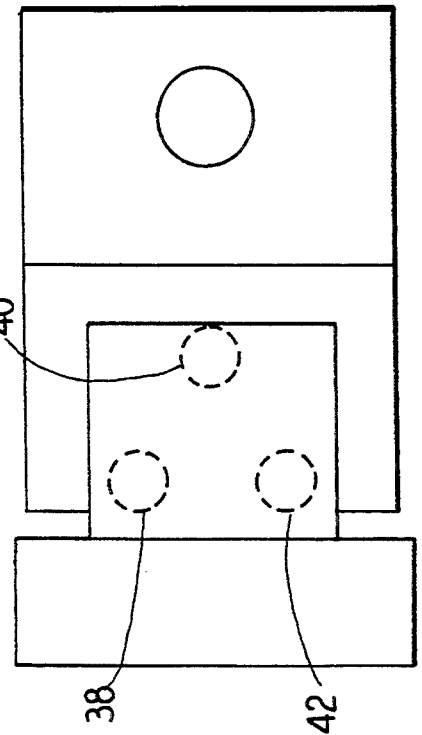
FIG. 10
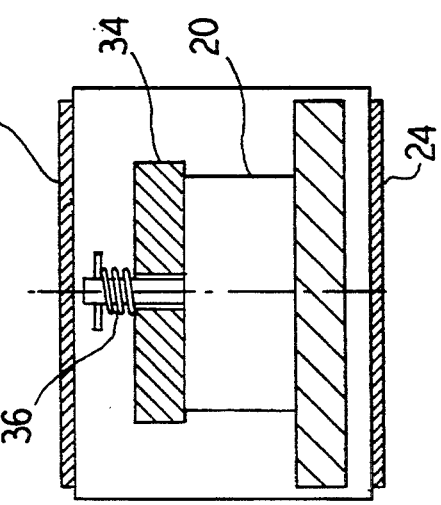
FIG. 9
FIG. 7

METHOD AND APPARATUS FOR COARSE AND FINE POSITIONING A MAGNETIC HEAD WITH THREE PIEZOELECTRIC ELEMENTS ARRANGED IN A TRIPOD ARRANGEMENT

This is a continuation of application Ser. No. 07/836,955, filed Feb. 19, 1992, now abandoned.

BACKGROUND OF THE INVENTION

1. Field of the Invention

The present invention relates to an apparatus and method for positioning a magnetic head with respect to various tracks of a magnetic tape in a streamer. The magnetic head is coarsely stepped to a desired track of the tape, and then finely positioned by at least one piezoelectric element.

2. Description of the Related Art

Conventional arrangements for positioning a magnetic head over various tracks of a magnetic tape can include the use of a comparator for determining the actual position of a read/write head, and a stepper motor for positioning the read/write head with respect to a particular track of a magnetic tape. Such an arrangement is described in U.S. Pat. No. 4,679,104 to Dahlerud. However, such a conventional arrangement is only suitable for a limited number of tracks, for example 20 tracks, on the same magnetic tape.

However, where a magnetic tape contains as many as 144 data tracks and 24 servo tracks, travelling from the upper edge of the tape to the lower edge of the tape with the a single channel magnetic head is extremely difficult, given spatial constraints.

SUMMARY OF THE INVENTION

It is therefore an object of the present invention to provide an apparatus and method for positioning a magnetic head to any of a number of tracks of a magnetic tape with at least one piezoelectric element. The magnetic head can be coarsely stepped, roughly to a desired track off the tape, and then finely positioned by the piezoelectric element.

The above object is inventively achieved in an apparatus for positioning a magnetic head with respect to a magnetic tape including a platform having a top and a bottom and at least one piezoelectric element arranged between the bottom of the platform and the magnetic head.

A method for positioning a magnetic head with respect to a magnetic tape includes the steps of coarse positioning the magnetic head with a platform having a top and a bottom, and fine positioning the magnetic head with at least one piezoelectric element. The piezoelectric element is arranged between the bottom of the platform and the magnetic head.

BRIEF DESCRIPTION OF THE DRAWINGS

FIG. 1 illustrates a prospective view of a first embodiment constructed in accordance with the principles of the present invention.

FIG. 2 illustrates a side-sectional view of the embodiment of FIG. 1.

FIG. 3 illustrates a front-sectional view taken generally along the line III—III of FIG. 2.

FIG. 4 illustrates a side-sectional view of a second embodiment constructed in accordance with the principles of the present invention.

FIG. 5 illustrates a front-sectional view taken generally along the line V—V of FIG. 4.

FIG. 6 illustrates a side-sectional view of a third embodiment constructed in accordance with the principles of the present invention.

FIG. 7 illustrates a front-sectional view taken generally along the line VII—VII of FIG. 6.

FIG. 8 illustrates a side-sectional view of a fourth embodiment constructed in accordance with the principles of the present invention.

FIG. 9 illustrates a front-sectional view taken generally along the line IX—IX of FIG. 8.

FIG. 10 illustrates a top-sectional view of the embodiment of FIG. 8.

DESCRIPTION OF THE PREFERRED EMBODIMENTS

Figure 11:
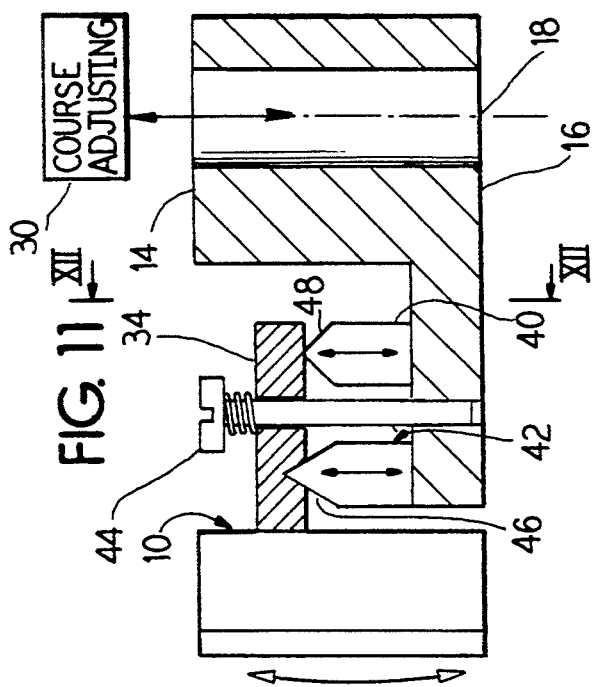
FIG. 11 illustrates a side-sectional view of a fifth embodiment constructed in accordance with the principles of the present invention.

As illustrated in FIG. 1, the apparatus of the present invention includes a magnetic head 10. A head positioning platform 12 is also provided. Preferably, the platform 12 is generally C-shaped. The platform 12 includes a generally horizontal top 14 and a generally horizontal bottom 16. A generally vertical cylindrical aperture 18, adapted to receive a bushing, or other suitable device for coarse movement, is also provided. A piezoelectric element 20 is arranged between the magnetic head 10 and the bottom 16 of the platform 12, for fine positioning the magnetic head 10 with respect to a particular track of a magnetic tape 22. A flexible holder 32 is provided for connecting the piezoelectric element 20 to the magnetic head 10. The flexible holder 32 need only be perpendicularly flexible with respect to the central axis of the aperture 18. The apparatus can also include a pair of leaf springs 24 connected along one side to the top 14 and bottom 16 of the platform 12, respectively, and connected along another side to a top 26 and a bottom 28 of the magnetic head 10, respectively.

As illustrated in FIG. 2, the platform 12 can be coarsely positioned by a suitable device 30, arranged in the aperture 18 of the platform 12. When the magnetic head 10 moves either up or down, relative to the platform 12, the distance from the front of the magnetic head 10 to the central axis of the aperture 18 varies slightly due to the leaf springs 24. A link (not shown) for connecting the flexible holder 32 to the piezoelectric element 20 preferably provides flexibility for slight movements of the magnetic head 10.

As illustrated in FIG. 3, a generally rectangular piezoelectric element 20 can be provided for fine positioning the magnetic head 10 with respect to the magnetic tape 22.

FIG. 4 illustrates a second embodiment of the present invention. The piezoelectric element 20 is arranged between the read/write head 10 and an L-shaped head positioning platform 12'. The head positioning platform 12' coarsely adjusts the magnetic head 10 by means of a suitable device 30, arranged in the aperture 18. The piezoelectric element 20 is provided for fine positioning of the magnetic head 10.

As illustrated in FIG. 5, a generally rectangular piezoelectric element 20 is provided for fine positioning the magnetic head 10.

FIG. 6 illustrates a third embodiment of the present invention. A rigid holder 34 is biased against the piezoelectric element 20 by a push spring 36. The piezoelectric element 20 is glued with a slightly flexible glue to the rigid holder 34 and to the bottom 16 of the platform 12 to provide for movement of the piezoelectric element 20. The platform 12 can be coarsely positioned by a suitable device 30, arranged in the aperture 18 of the platform 12, as in FIG. 2.

As illustrated in FIG. 7, a generally rectangular piezoelectric element 20 can be provided for fine positioning the magnet head 10 with respect to the magnetic tape 22.

Referring to FIGS. 8 and 9, three piezoelectric elements 38, 40, 42 are arranged between the rigid holder 34 and the bottom 16 of the platform 12'. The piezoelectric elements 38, 40, 42 (illustrated in FIGS. 9 and 10) can be glued to the rigid holder 34 and to the bottom 16 of the platform 12'. Piezoelectric element 40 is provided for adjusting the zenith angle of the magnetic head 10. Thus, both azimuth and zenith angles of the magnetic head 10 can be adjusted simultaneously in this embodiment, and the resulting position of the magnetic head 10 can be stored in a memory.

Mechanical tolerances in the arrangement illustrated in FIG. 8 are compensated for by applying different voltages to each of the piezoelectric elements 38, 40, 42 until the azimuth and zenith angles of the magnetic head 10 are adjusted within defined tolerance limits. Such mechanical tolerances include tolerances in the magnetic head 10, in the head mounting on the platform 12', and in the platform mounting relative to cartridge references in the drive.

Additionally, positioning errors can arise from the tape cartridges. One such error is known as tape slope error, and refers to the angle the centerline of the magnetic tape describes relative to the cartridge reference plane. The tape slope error can be compensated for by adjusting the alignment of the read channel relative to the write channel of the magnetic head 10. Azimuth and alignment tolerances are discussed in U.S. Pat. No. 4,866,548, incorporated herein by reference.

The azimuth and zenith angles must remain constant when fine positioning the magnetic head 10. Thus, tolerance and error adjustments must be made either prior or subsequent to fine positioning the magnetic head 10. In order to fine position the magnetic head 10, the piezoelectric elements 38, 40, 42 are simultaneously activated by uniformly increasing or decreasing the voltage level of the piezoelectric elements 38, 40, 42 such that the voltage differences between the piezoelectric elements 38, 40, 42 are maintained to compensate for tolerances and errors during fine positioning.

The azimuthal adjustment of the magnetic head 10 is also provided for, as illustrated in FIG. 9.

FIG. 10 illustrates the relative positions of the piezoelectric elements 38, 40, 42.

Figure 12:
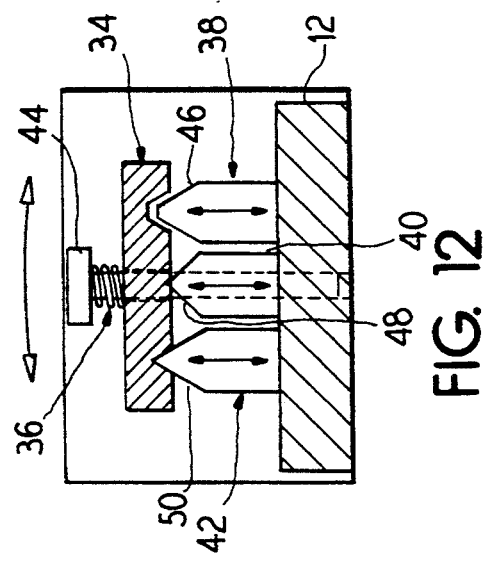
FIG. 12 illustrates a front-sectional view taken generally along the line XII—XII of FIG. 11.

As illustrated in FIGS. 11 and 12, the holder 34 can be spring biased against the piezoelectric elements 38, 40, 42 by a push spring 36. The push spring 36 is arranged between the holder 34 and a screw, or other suitably attached device 44.

Figure 13:
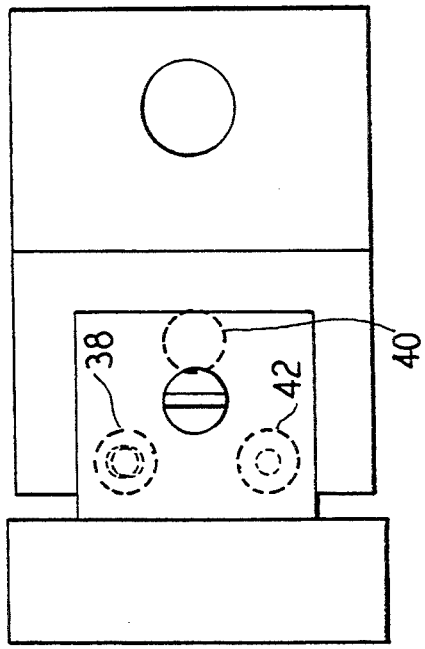
FIG. 13 illustrates a top-sectional view of the embodiment of FIG. 11.

FIG. 13 illustrates the location of the holder 34 relative to the platform 12', as defined by the position of piezoelectric elements 38, 42. Piezoelectric element 40 is substantially conical at a top end 48, as illustrated in FIGS. 11 and 12, and is disposed against a flat surface of the holder 34. Piezoelectric elements 38, 42 are substantially conical at top ends 46, 50, respectively. The top end 50 of piezoelectric element 42 is arranged in a conical recess of the holder 34. The top end 46 of piezoelectric element 38 is arranged in a conical recess, having a substantially elliptical, or other suitable geometric cross-section, of the holder 34. The geometry of the cross-section of the conical recess in which the top end 46 is arranged compensates for tolerance limits on the distance between the piezoelectric elements and the recesses.

Figure 14:
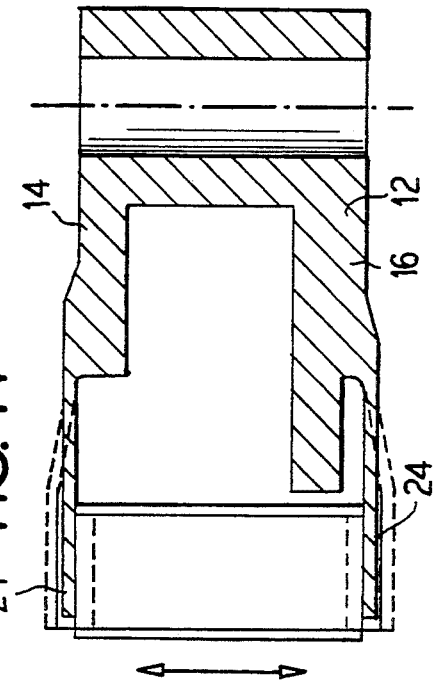
FIG. 14 is a partial side-sectional view of a sixth embodiment constructed in accordance with the principles of the present invention, illustrating a platform having an integral pair of leafsprings.

As illustrated in FIG. 14, the platform 12 can be formed in whole or in part of a flexible material, such as a flexible plastic or other suitable material, with leaf-springs 24 integrally formed in the platform 12.

Thus, it is contemplated that at least one piezoelectric element is used to fine position the magnetic head with respect to a particular track of the magnetic tape. In a preferred embodiment, the apparatus of the present invention includes a pair of leaf springs connecting the top and bottom of the platform to the top and bottom of the magnetic head, respectively. However, any suitable number of leaf springs having a suitable geometry can be provided.

An apparatus constructed in accordance with the principles of the present invention provides at least one piezoelectric element for adjusting a magnetic head within the range of ±20 μm. The at least one piezoelectric element can be generally rectangular, or any other suitable shape for fine adjusting the magnetic head.

Although other modifications and changes may be suggested by those skilled in the art, it is the intention of the inventor to embody within the patent warranted hereon all changes and modifications as reasonably and properly come within the scope of his contribution to the art.

I claim:

1. An apparatus for positioning a magnetic head with respect to a magnetic tape comprising:
   mechanical magnetic head positioning means for vertical coarse positioning said magnetic head with respect to said magnetic tape; and
   piezoelectric operated means, carried on said mechanical magnetic head positioning means and connected to said magnetic head, for finely adjusting the position of said magnetic head with respect to said magnetic tape;
   wherein said piezoelectric operated means comprises three piezoelectric elements in a tripod arrangement which selectively elongate or contract along an axis parallel to a direction of position adjusting of said head to provide for vertical and angular adjustment of said head.

2. An apparatus according to claim 1, wherein said piezoelectric operated means adjusts said magnetic head within the range ±20 μm.

3. An apparatus according to claim 1, further comprising a resilient holder means connecting said piezoelectric operated means and said magnetic head for supporting said magnetic head.

4. An apparatus according to claim 1, further comprising a rigid holder disposed between said piezoelectric operated means and said magnetic head.

5. An apparatus according to claim 4, further comprising push spring means for biasing said rigid holder against said piezoelectric operated means.

6. An apparatus for positioning a magnetic head with respect to a magnetic tape comprising:
mechanical magnetic head positioning means for vertical coarse positioning said magnetic head with respect to said magnetic tape; and
piezoelectric operated means, carried on said mechanical magnetic head positioning means and connected to said magnetic head, for finely adjusting the position of said magnetic head with respect to said magnetic tape;
wherein said piezoelectric operated means comprises a first piezoelectric element which selectively elongates or contracts along an axis parallel to a direction of position adjusting of said head; and
wherein said piezoelectric operated means comprises two additional piezoelectric elements, and wherein said first and additional piezoelectric elements are arranged in a tripod arrangement to provide for both vertical and zenith and azimuth angular adjustment of said magnetic head.

7. An apparatus according to claim 6, further comprising a rigid holder disposed between said magnetic head and said piezoelectric elements.

8. An apparatus according to claim 7, further comprising push spring means for biasing said rigid holder against said piezoelectric elements.

9. An apparatus according to claim 8, further comprising a screw arranged through an aperture in said rigid holder and through an aperture in said magnetic head positioning means, said push spring means disposed between said screw and said rigid holder.

10. An apparatus according to claim 9, said rigid holder further comprising a substantially conical recess and a substantially conical recess having an elliptical cross-section, and wherein at least two of said piezoelectric elements have substantially conical top ends arranged in said recesses to provide for movement of said rigid holder with respect to said magnetic head.

11. An apparatus for positioning a magnetic head with respect to a magnetic tape comprising:
mechanical magnetic head positioning means for vertical course positioning said magnetic head with respect to said magnetic tape, said mechanical magnetic head positioning means including a platform structure having a generally horizontal bottom leg and a generally vertical leg connected to the generally horizontal bottom leg; and
three piezoelectric means, vertically arranged in a tripod arrangement only on said generally horizontal bottom leg of said platform structure and connected to said magnetic head for vertical elongating movement in a plane substantially parallel to a longitudinal axis of said magnetic head, and for zenith and azimuth adjustment for fine positioning said magnetic head relative to said platform structure.

12. An apparatus according to claim 11, wherein said at least one piezoelectric means adjusts said magnetic head within a range of ±20 μm.

13. A method for positioning a magnetic head with respect to a magnetic tape comprising the steps of:
vertical coarse positioning said magnetic head with a platform having a top and a bottom; and
fine positioning said magnetic head relative to said platform with three piezoelectric elements arranged in a tripod arrangement, arranged between said bottom of said platform and said magnetic head, by selectively elongating or retracting a length of each of said piezoelectric elements along an axis parallel to a positioning direction of said head to provide for vertical and angular adjustment of said head.

14. An apparatus for positioning a magnetic head with respect to a magnetic tape in a low profile tape read/write apparatus comprising:
mechanical magnetic head positioning means for vertical coarse positioning said magnetic head with respect to said magnetic tape; and
piezoelectric fine positioning means carried on said mechanical magnetic head positioning means for finely adjusting the position of said magnetic head with respect to said magnetic tape, said fine positioning means comprising three piezoelectric column supports for said magnetic head, arranged in a tripod arrangement and selectively elongating or contracting to position the magnetic head to provide for vertical and angular adjustment of said head.

15. A method for positioning a magnetic head with respect to a magnetic tape in a low profile tape read/write apparatus comprising the steps of:
coarse positioning said magnetic head in a vertical direction with a platform having a top and bottom; and
fine positioning said magnetic head relative to said platform with a fine positioning device carried on said platform, said fine positioning device providing three electrically activated piezoelectric extendable columns arranged in a tripod arrangement and supporting said head from said platform, by selectively electrically charging each of said columns to provide for vertical and angular adjustment of said head.

* * * * *